Patented Jan. 17, 1939

2,143,924

UNITED STATES PATENT OFFICE 2,143,924

MANUFACTURE OF ANHYDRIDES OF UNSATURATED ALIPHATIC MONOBASIC ACIDS

Leon Rubenstein, Saltcoats, Scotland, assignor to Imperial Chemical Industries Limited, a corporation of Great Britain No Drawing. Application November 21, 1934, Serial No. 754,175. In Great Britain November 20, 1933

4 Claims. (Cl. 260—548)

This invention relates to the production of anhydrides of polymerizable unsaturated aliphatic acids and in particular to the production of anhydrides of acrylic acid or homologues of acrylic acid such for example as α-methyl-acrylic acid.

A method commonly employed for the production of the anhydrides of monobasic aliphatic acids comprises the treatment of an alkali salt of the acid with the corresponding acid chloride. It has also been proposed to use instead of the acid chloride, chlorides such for example as phosphorus oxychloride, sulphuryl chloride or thionyl chloride.

I have now found that in the production of anhydrides of readily polymerizable acids considerable loss of yield may occur due to polymerization of the acid in the course of the reaction. I have now found, however, that the use of thionyl chloride in contrast to the use of other acid chlorides already known for the production of anhydrides of non-polymerizable acids permits of the production of the desired anhydride in good yield. According to the present invention the anhydride of an unsaturated aliphatic acid particularly of a polymerizable nature, is prepared by heating the alkali metal salt or the alkaline earth metal salt of the acid with thionyl chloride to a temperature preferably not exceeding 100° C. The reaction is suitably conducted in the presence of an inert diluent which is a solvent both for the acid and for its anhydride. The reactants are preferably employed in as dry a state as possible, and the reaction should be conducted in a dry atmosphere. Advantageously the mixture is refluxed at a temperature below 100° C. until the reaction is substantially complete. The liquid containing the acid anhydride in solution may then be removed by filtration or decantation from the precipitated inorganic salt, which may be extracted, if desired, with fresh solvent, or water may be added to the reaction mixture and the aqueous solution of the inorganic salt may be separated from the solution of the acid anhydride, which is subsequently dried. The anhydride is then separated from the solution and purified by known methods.

Suitable metal salts that may be employed for the process of the present invention are those of sodium, potassium calcium or barium. The inert diluent employed may be a volatile hydrocarbon oil, preferably of an aliphatic nature, and any low boiling fraction of commercial petroleum oils are suitable.

The invention relates in particular to the production of the anhydrides of acrylic acid or its homologues. The anhydride of α-methacrylic acid has been prepared by the process of the present invention and is a liquid boiling at 84° C. under 11 mms. pressure, a refractive index of 1.4525 at 25° C. and a specific gravity of 1.0243 at 20° C.

The following examples illustrate, without limiting my invention. Unless otherwise stated, the proportions given in the examples are by weight.

Example 1

A solution of 65 parts thionyl chloride in 250 parts by volume of dry petrol ether (B. P. 40–60° C.) is gradually added to 130 parts of dry potassium methacrylate contained in a vessel provided with a reflux condenser. The temperature is then raised to 55–60° C. and the mixture kept refluxing for 6 hours. The product is cooled, diluted, if desired with a further quantity of petrol ether, and the insoluble material separated from the solution by filtration or decantation.

The petrol ether solution of the anhydride is distilled at ordinary pressure until the bulk of the petrol ether has been removed, and the residue is distilled at reduced pressure. Methacrylic anhydride is thus obtained as a water white liquid boiling at 87° C. under 13 mm. pressure, the yield being over 80% calculated on the potassium methacrylate taken. On analysis, the product gave the following figures:

C—61.95%  H—6.48%

Methacrylic anhydride requires:

C—62.3%  H—6.49%

Example 2

55 parts of thionyl chloride dissolved in 140 parts by volume of petrol ether are added gradually to 100 parts of sodium crotonate in a cooled flask provided with a reflux condenser. The procedure of Example 1 gives a good yield of crotonic anhydride.

I claim:
1. A process for the production of the anhydride of methacrylic acid which comprises adding a solution containing approximately 65 parts of thionyl chloride and approximately 250 parts of petrol ether gradually to approximately 130 parts of dry potassium methacrylate, refluxing the resulting mixture at a temperature of from 55 to 60° C. for approximately 6 hours, separating the insoluble material by filtration, and removing the methacrylic acid anhydride from the filtrate by distillation.
2. In a process for the production of the anhy- dride of methacrylic acid the step of reacting thionyl chloride with a salt of methacrylic acid selected from the class consisting of alkali metal salts and alkaline earth metal salts.

3. A process for the production of the anhydride of methacrylic acid which includes the step of reacting thionyl chloride at an elevated temperature not exceeding 100° C. with a salt of methacrylic acid selected from the class consisting of the alkali metal salts and the alkaline earth metal salts.

4. A process as claimed in claim 1 in which the reaction is conducted in the presence of an inert diluent.

LEON RUBENSTEIN.